United States Patent [19]

Cosmos

[11] 4,219,993
[45] Sep. 2, 1980

[54] LAWN RAKES

[75] Inventor: Pete Cosmos, Massillon, Ohio

[73] Assignee: True Temper Corporation, Cleveland, Ohio

[21] Appl. No.: 706,778

[22] Filed: Jul. 19, 1976

[51] Int. Cl.³ .............................................. A01D 7/00
[52] U.S. Cl. ................................................. 56/400.17
[58] Field of Search ........... 56/400.17, 400.11, 400.12; 76/111; D39/1 R

[56] References Cited

U.S. PATENT DOCUMENTS 3,724,188  4/1973  Eads ................................ 56/400.17

FOREIGN PATENT DOCUMENTS 18111 of 1929 Australia ............................... 56/400.17
113695 8/1941 Australia ............................... 56/400.17
565919 11/1958 Canada ................................. 56/400.17

Primary Examiner—Jay N. Eskovitz
Attorney, Agent, or Firm—Squire, Sanders & Dempsey

[57] ABSTRACT

There is disclosed herein a plastic lawn rake head or lawn broom head having a sheet-like body member, a rearwardly opening handle socket, a perpendicular wall around the edge of the body portion, and forwardly projecting raking prongs. The body portion is pleated to provide stiffness in the sheet-like area of said body portion while allowing the desired flexibility of the prongs.

8 Claims, 8 Drawing Figures

LAWN RAKES

This invention relates to hand rakes and particularly to an improved rake of the type known in the art as a "lawn rake" or "lawn broom".

The popular fan-shaped lawn rake, commonly made from bamboo or steel, has been manufactured in recent years from modern plastics by the process of molding the prongs integrally with a main body member having means for attaching a handle thereto. This construction presents the problem of providing the body member with sufficient stiffness while at the same time providing raking prongs of the proper flexibility. It is well known that modern plastics are available having almost any desired degree of rigidity or flexibility. The real problem is to so form the body member that it will be strong and rigid and will provide a firm base for the handle and prongs without resorting to the use of excessive amounts of plastic material which add to both the cost and weight of the rake. Furthermore, it is desirable to achieve the desired strength and rigidity in the body member without the use of unsightly ribs, flanges, gussets or the like projecting from the surface of said body member.

References which have been reviewed in this field of art include U.S. Pat. Nos. 1,179,088; 1,780,180; 1,780,748; 1,870,739; 1,956,263; 2,456,876; 2,847,816; 2,935,754; 3,164,945; 3,413,790; 3,624,855; 3,654,754; 3,707,835; 3,724,188; 3,818,688 and 3,819,288; U.S. Pat. Nos. Des. 54,878; 223,743; 223,794 and 233,305; Canadian Pat. No. 454,899 and United Kingdom Pat. No. 796,116. Particular portions of some of these references are of note with reference to the subject invention.

United Kingdom Pat. No. 796,116 discloses a fan-shaped rake head stamped out of metal wherein the rake prongs or "arms" are reinforced by "circumferential connecting webs" which with the "arms" form "a plurality of slots" which are wider at their outer ends than at their inner ends.

U.S. Pat. No. 1,870,739 discloses a fan-shaped rake head "formed from two substantially sector shaped plates" which "are formed with lineally indented beads or ribs to stiffen and strengthen the supporting structure".

U.S. Pat. No. 2,847,816 discloses a fan-shaped rake head of bamboo or steel formed of diverging finger strips. Where the overlapping strips forming a sheet-like portion begin to separate into separate fingers, they are reinforced by a "straight and generally rigid stiffening means". Farther out on the fingers a "flexible reinforcing member 37 is provided across the tines 14 at an intermediate and suitable point beyond the stiffening means".

U.S. Pat. No. 3,654,754 discloses a particular early design of plastic rake head using a supporting flat "generally triangle base plate" with teeth or tines extending therefrom. U.S. Pat. No. 3,707,835 discloses a glass reinforced plastic rake.

U.S. Pat. No. 3,724,188 and U.S. Pat. No. Des. 233,305 show a more recent development in plastic rake heads using the fan shape of U.K. Pat. No. 796,116; U.S. Pat. No. 1,870,739 and U.S. Pat. No. 2,847,816 with the sector-shaped base reinforced with ribbing as in U.S. Pat. No. 1,870,739, the combination "stiffening means" and "flexible reinforcing means" of U.S. Pat. No. 2,847,816 in a web-type formation like that in U.K. Pat. No. 796,116. However, the rake head of U.S. Pat. No. 3,724,188 is further modified in the use of tapered ribs extending the length of the tine from the "stiffening means" so that the tines are increasingly flexible toward their tips.

The subject invention represents a further evolution in plastic rake heads in removing the ribbing which introduces local stresses in the sheet-like base portion of the rake head, in using a new form of stiffening which minimizes local stresses in the sheet-like base portion, in using uniform ribs on the rake tines or prongs to spread the bending strain as uniformly as possible along each tine or prong and in strengthening and making more rigid the "flexible reinforcing means" on the prongs to spread lateral strain caused by the stress of raking action.

The present invention is a molded plastic lawn rake head comprising a substantially triangular or sectorial sheet-like body member having raking prongs projecting therefrom in a direction which for the sake of definition is identified as the forward direction and a handle socket therein in which the socket opening faces in the rearward direction of said member. The body member is further strengthened by a wall extending around the edges of said body member and attached to said edges substantially perpendicular to the plane of said body member. The sheet-like body member is undulating in form, preferably accordion-pleated, and affords a plurality of planar portions alternately angled and integrally attached along their side edges. The pleating of the body member provides the required strength and stiffness in the body member and at the same time eliminates the need for supplemental reinforcing elements which require the use of more complicated molds and detract from the appearance of the rake.

The general object of this invention is to provide a lawn rake head of the type referred to having improved means for stiffening the body member thereof.

Another object of the invention is to provide a lawn rake head of the type referred to wherein the need for supplemental reinforcing means in the body member is eliminated.

Still another object of the invention is to provide a lawn rake head as set forth above wherein the body member is especially strong in the direction of greatest stress during raking motions.

A further object of the invention is to provide a lawn rake head having the features and characteristics as set forth above which is simple to manufacture and highly durable in use.

Still another object of the invention is to provide a lawn rake head of the type referred to which provides an attractive appearance.

Other objects of the invention and the invention itself will be readily understood from the following description of one embodiment thereof, illustrated in the accompanying drawings in which.

Figure 1:
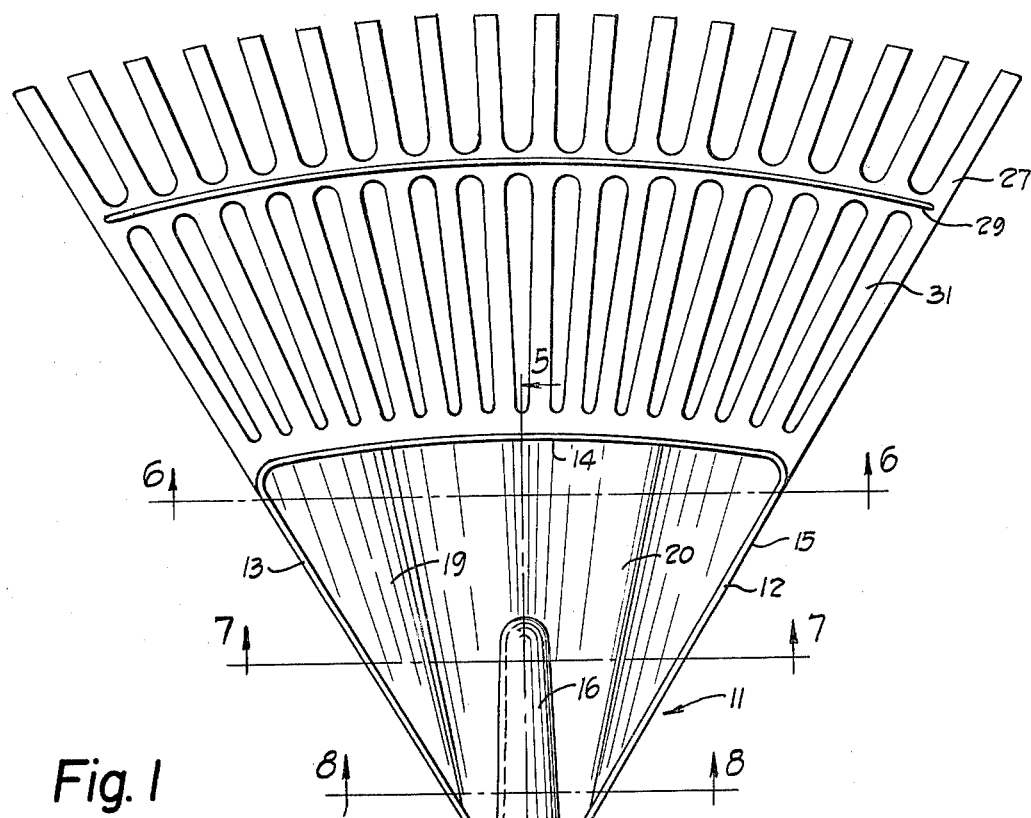
FIG. 1 is a top plan view of the lawn rake head of this invention.
Figure 2:
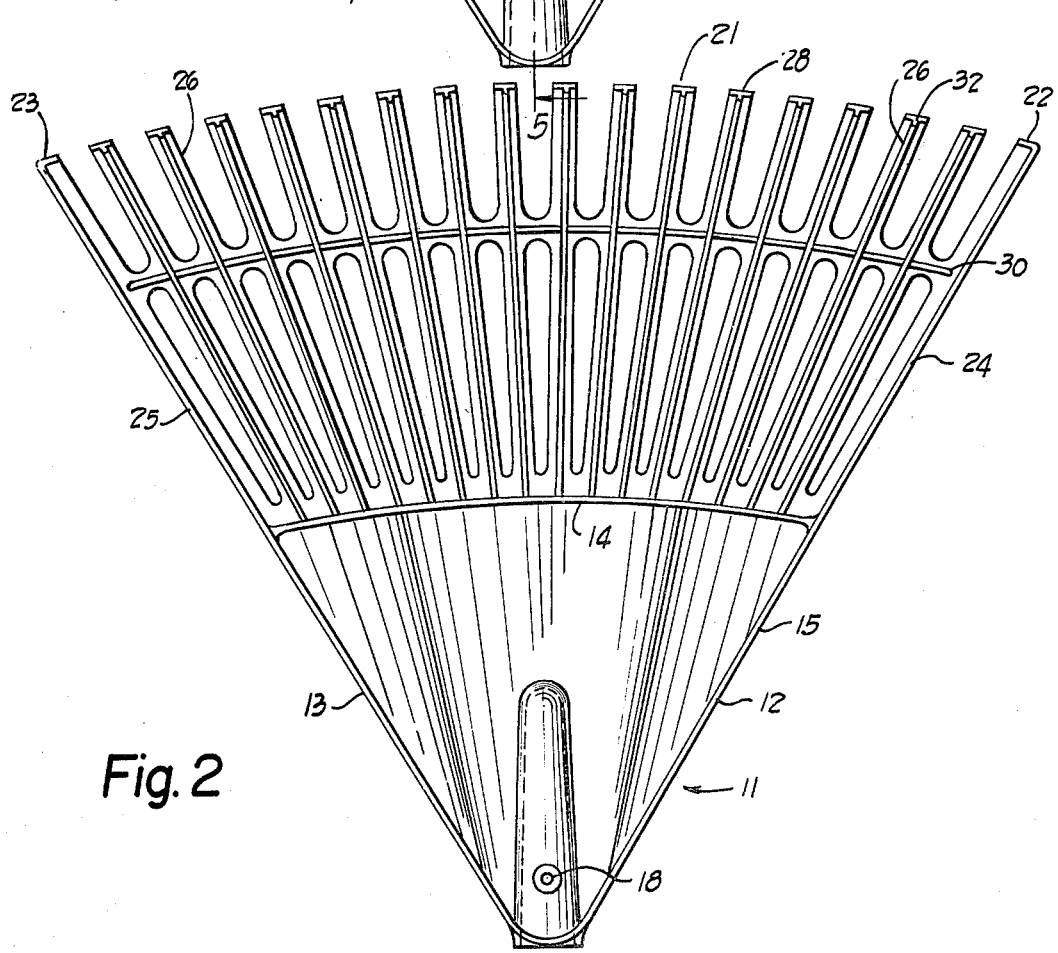
FIG. 2 is a bottom plan view of the lawn rake head of FIG. 1.

More particularly, in the rake head of this invention a sectorial-shaped sheet-like body member 11 is defined by two side edges 12 and 13 and a front edge 14. Around said edges and attached thereto is a wall 15 substantially perpendicular to the general plane of the body member 11. One end of each of the side edges 12 and 13 terminates where it meets the outside of the handle socket 16 molded into the body member 11. The other ends of said side edges 12 and 13 are joined by the front edge 14. The handle socket 16 extends through the wall 15 after intersecting side edges 12 and 13 and forms an opening 17. A plane through the axis of the handle socket 16 and perpendicular to the general plane of the body member 11 substantially bisects the angle formed by side edges 12 and 13. On the bottom side of the handle socket 16 (FIG. 2) there is a hole 18 through which a nail, screw, rivet or similar capped fastener can be inserted into a handle (not shown) in the handle socket 16 to prevent separation of the handle and handle socket.

Figure 3:
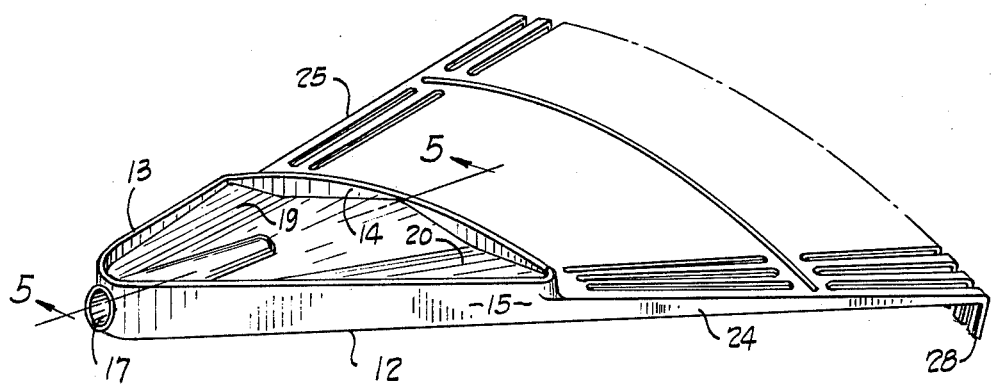
FIG. 3 is a perspective view showing portions of the top and one side of the rake head.
Figure 4:
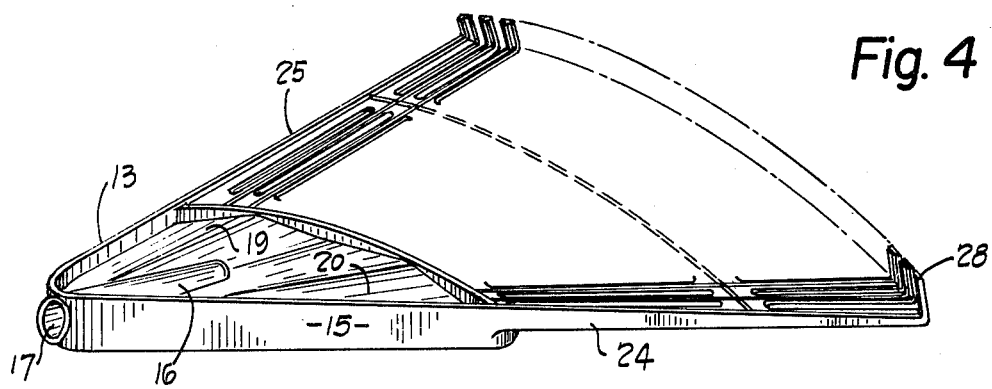
FIG. 4 is a perspective view showing portions of the bottom and one side of the rake head.
Figure 5:
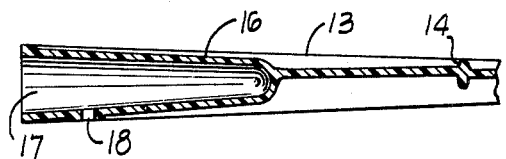
FIG. 5 is a section taken along the line 5—5 of FIGS. 1 and 3 showing a detail of the rake handle socket.
Figure 7:
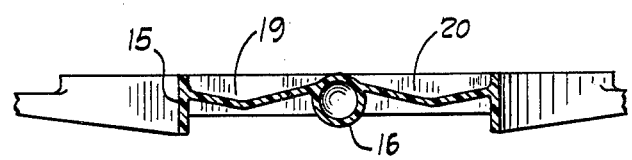
FIG. 7 is a section taken along the line 7—7 of FIG. 1.
Figure 6:
FIG. 6 is a section taken along the line 6—6 of FIG. 1.
Figure 8:
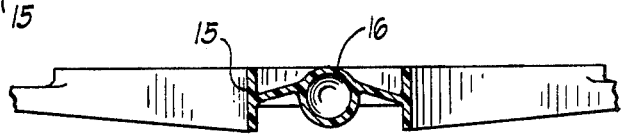
FIG. 8 is a section taken along the line 8—8 of FIG. 1.

The sheet-like body member 11 is partially strengthened and stiffened by the wall 15. In addition, the body member 11 is undulating in form with the waves running generally from the rearward portion of said member to the front edge 14. It has been found that two such undulations or waves 19 and 20, preferably folded as in pleats, give a satisfactory combination of strength and balance between rigidity and flexibility, but more of such undulations can be used if desired. In the illustrated embodiment the undulations 19 and 20 are inverted so that they crest in the bottom surface rather than the top surface. This tends to allow the body member 11 more flexibility in forming into a trough shape about the axis of the handle socket 16 as illustrated in FIG. 3 as compared to the same type of forming in the body member 11 as illustrated in FIG. 4. This tendency can be reversed by inverting the undulations 19 and 20, and the difference in such flexibility is reduced by the use of more undulations. Note that the undulations 19 and 20 extend forward to the front edge 14 from side edges 12 and 13 respectively close to socket opening 17 or to the functions of said edges with the outside of the handle socket 16, and said undulations do not cross a plane through the axis of the handle socket 16 and perpendicular to the general plane of the body member 11.

A plurality of raking prongs 21, 22 and 23 extend forward from the front edge 14 and the wall 15 along said edge. The outer prongs 22 and 23 are reinforced by extensions 24 and 25 of the wall 15 along side edges 12 and 13 respectively. Each of the other prongs 21 is strengthened by an integral center rib 26, preferably on the bottom side of each prong. Said ribs 26 are preferably uniform in size over their length.

The prongs 21, 22 and 23 are further supported by being interconnected by a reinforcing cross member 27 intersecting and integral with all of said prongs in a line preferably parallel to the front edge 14 of the body member 11 and over half-way from said front edge 14 to the tip 28 of each prong, said prong tips 28 also preferably forming a line parallel to said front edge 14 and said cross member 27. The front edge 14 and/or the cross member 27 and/or the line of said prong tips 28 can be a straight line to form a substantially triangular body member 11 or total rake head or they can be a curved line to form a substantially sectional body member 11 or total rake head. The cross member 27 is preferably reinforced by one or more ribs 29 and 30, preferably uniform in shape or cross section throughout their respective lengths and preferably positioned on the top and bottom of said cross member.

It should be noted that the prongs 21, 22 and 23 between the front edge 14 and the cross member 27 define long openings 31 which preferably widen proceeding forward or outward on said prongs, but each of said openings 31 can be uniform in size, and said openings 31 can be the same or different from each other. It should also be noted that stresses on said prongs 21, 22 and 23 are reduced at junctions by the use of gentle curved junctions 32 rather than sharp corners.

The tips 28 of prongs 21, 22 and 23 are shown at right angles to said prongs, but said tips 28 can be at any desired angle. Similarly, the dimensions of each defined part of the illustrated embodiment can be varied within the above description to achieve desired rigidity, strength and utility as set forth, for example, in U.S. Pat. No. 3,724,188. However, the primary invention resides in the undulations in the body member and the secondary invention resides in the use of uniform ribs on the prongs and the cross member to distribute strain as evenly as possible throughout the rake notwithstanding the normal application of stresses unevenly to the various parts of the rake head.

I claim:

1. A molded plastic rake head comprising
a body member of sheet-like form lying generally in a plane and having two substantially straight side edges, one end of each of which terminates at a handle socket having a rake handle receiving opening and the other ends of which are joined by a front edge, there being a wall extending around said edges and attached to said edges substantially perpendicular to said general plane,
said body member containing said elongated handle socket integral with and extending in said plane from said socket opening toward said front edge, a plane through the axis of said socket and substantially perpendicular to said general plane substantially bisecting the angle formed by said side edges,
said body member having at least one undulation on each side of said socket, the crest of at least one such undulation on each side of said socket extending from each of said side walls in spaced relation to said socket opening to the wall on said forward edge without crossing the center line of said socket,
there being a plurality of raking prongs projecting forwardly from said opening out from the wall on said front edge.

2. A rake head in accordance with claim 1 wherein said undulations are in the form of accordion pleats.

3. A rake head in accordance with claim 2 wherein there are only two undulations.

4. A rake head in accordance with claim 3 wherein said raking prongs are substantially in the same plane as said body member.

5. A rake head in accordance with claim 4 wherein substantially all the prongs are reinforced by integral ribs running substantially the full length of said prongs.

6. A rake head in accordance with claim 5 wherein said ribs are of uniform cross section throughout their lenghts.

7. A rake head in accordance with claim 6 wherein said ribs are on the bottom side of said prongs.

8. A rake head in accordance with claim 7 wherein said prongs are interconnected by a reinforcing cross member intersecting and integral with all of said prongs and located over half-way between said front edge and the tips of said prongs.

* * * * *